United States Patent [19]

Shelton, Sr. et al.

[11] 4,030,226

[45] June 21, 1977

[54] INSECT CARRIER AND DISPENSER APPARATUS

[76] Inventors: Jack P. Shelton, Sr., 3790 William Paul Drive, Austell, Ga. 30001; John M. Adam, 1209 Baker Lane, Marietta, Ga. 30062

[22] Filed: May 6, 1976

[21] Appl. No.: 683,822

[52] U.S. Cl. .................................................. 43/55
[51] Int. Cl.² ........................................ A01K 97/04
[58] Field of Search .................. 43/55; 221/83, 133

[56] References Cited

UNITED STATES PATENTS

| | | | |
|---|---|---|---|
| 2,718,088 | 9/1955 | Perry et al. | 43/55 |
| 2,883,788 | 4/1959 | Stitt | 43/55 |
| 3,308,570 | 3/1967 | Horton | 43/55 |

Primary Examiner—Warner H. Camp

[57] ABSTRACT

A container is provided for receiving a quantity of crickets or other insects, and a number of separate insect-receiving chambers are attached to the container. An entrance gate between the container and the plural chambers permits access to only one chamber at a time, so that an insect can enter each of the chambers in turn from the container by manipulation of the entrance gate. An exit gate allows an insect to be removed from only one of the chambers at a time, in turn, and the entrance gate and exit gate are interconnected in offset relation so that the entrance gate and the exit gate cannot be concurrently aligned with the same chamber.

6 Claims, 6 Drawing Figures

INSECT CARRIER AND DISPENSER APPARATUS

This invention relates in general to apparatus for carrying and dispensing insects, and in particular to apparatus for carrying and dispensing crickets or similar insects used for fishbait.

Insects such as crickets are commonly used as bait for fishing, and it can be difficult for a fisherman to contain a supply of crickets while only withdrawing one cricket at a time as needed for bait. The crickets or similar insects obviously must be kept in an airy enclosure to prevent suffocation, but the active nature of such insects makes it difficult to remove only one cricket at a time from an enclosure full of active hopping crickets.

A popular cricket holder of the prior art includes a mesh cage for containing a quantity of crickets, with a plugged opening for allowing the crickets to exit. The opening is only slightly larger than the body of the cricket, so that only one cricket at a time can pass through the exit opening when unplugged, at least in theory. In practice, however, those skilled in the art realize that it is difficult to grasp and hold only a single cricket as it emerges from the exit opening, while simultaneously holding the cricket cage and replugging the exit opening to prevent other crickets from escaping. This task is made more complicated if the fisherman has wet hands, or is concurrently holding his fishing pole or hook while attempting to remove a cricket from the cricket holder.

According to the present invention, there is provided an insect carrier and dispenser apparatus which allows no more than one cricket or other insect at a time to escape in a controlled manner from an insect container. Stated somewhat more particularly, the present apparatus provides a number of separate insect-receiving chambers adjacent to an insect container, an entrance means which controls the movement of insects into the chambers from the container, and an exit means which opens only one chamber at a time for the removal of an insect previously disposed therein. The entrance means and exit means are interconnected together so that an insect always exits a chamber the entrance to which is blocked by the entrance means at that time.

Accordingly, it is an object of the present invention to provide an improved apparatus for carrying and dispensing insects.

It is another object of the present invention to provide bait carrying and dispensing apparatus for receiving a quantity of insects such as crickets, and for dispensing only one such insect at a time upon demand.

Other objects and advantages of the present invention will become more readily apparent from the following description of the disclosed preferred embodiment thereof, as shown in the Figures wherein.

Figure 1:
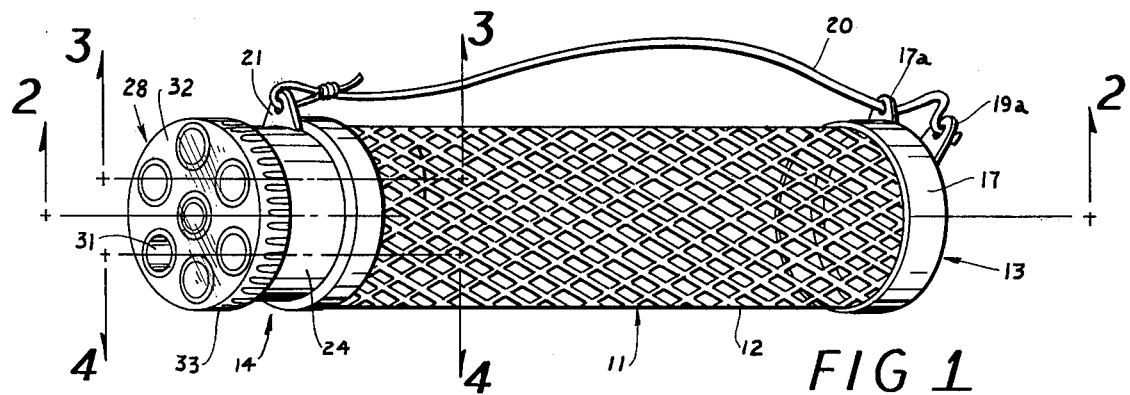
FIG. 1 is an overall pictorial view showing the disclosed embodiment of the present invention.

Turning to FIG. 1, an insect carrier and dispenser apparatus according to the disclosed embodiment of the invention is shown generally at 10 and includes an insect carrier 11 in the shape of a hollow cylinder made of a porous material such as mesh having openings 12 which are sufficiently small to contain the desired insects within the carrier. The carrier may be made of a metallic or plastic mesh material, although suitable plastic or other nonmetallic materials are usually preferable to avoid rusting or corrosion. The open ends of the cylindrical carrier 11 are closed with the first end member 13 and the second end member 14.

Figure 2:
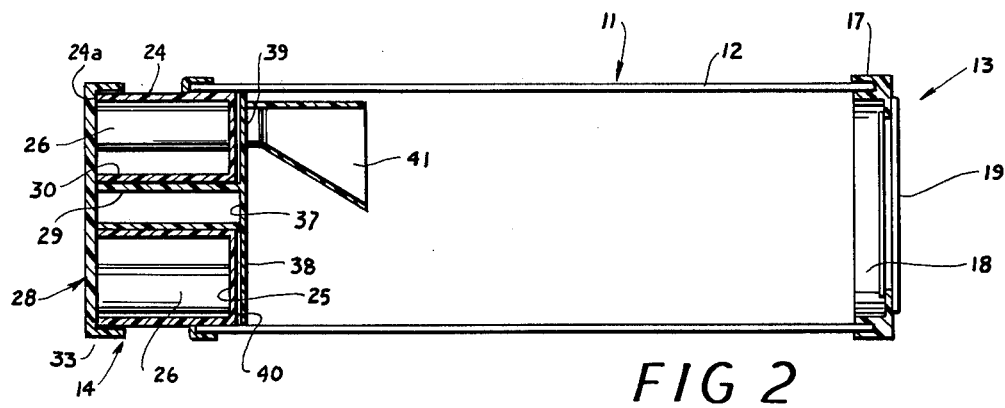
FIG. 2 is a section view taken along line 2—2 of FIG. 1.
Figure 3:
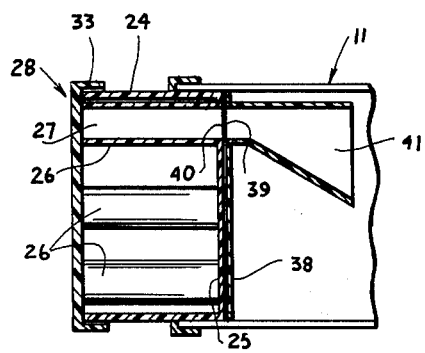
FIG. 3 is a section view taken along line 3—3 of FIG. 1.
Figure 4:
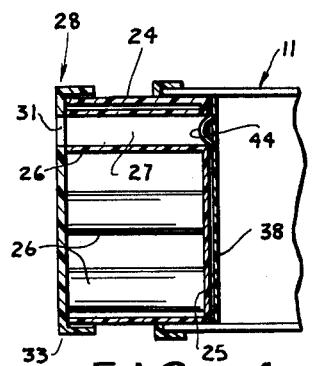
FIG. 4 is a section view taken along line 4—4 of FIG. 1.
Figure 6:
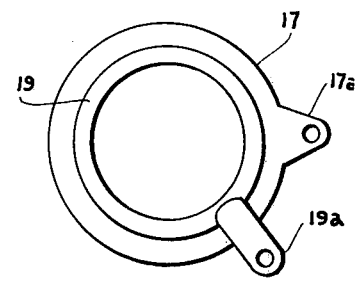
FIG. 6 is a right end elevation view of the disclosed embodiment.

The first end member 13, as best seen in FIGS. 2 and 6, includes an annular rim 17 which engages the open end of the carrier 12, and which defines an opening 18 through which a quantity of crickets or other insects are inserted into the carrier 11. The opening 18 is normally closed by the plug 19, which is removably retained within the opening by engagement with the rim 17. Both the rim 17 and the plug 19 may be made of an appropriate molded plastic material, and the plug 19 can be provided with a frictional snap-fit engagement within the opening 18. Both the rim 17 and the plug 19 may, if desired, be provided with respective tabs 17a and 19a through which a tote strap 20 passes to prevent the plug 19 from being lost. The tote strap may also pass through a tab 21 on the second end member 14.

The second end 14 includes the cylindrical shell 24 which is open at the outer end 24a, and which has an end wall 25 at the inner end 24b. The inner end 24b of the second end 14 is secured to an open end of the carrier 11. Disposed within the cylindrical shell 24 is a number of separate insect-receiving chambers 26, which in the disclosed embodiment are provided by a number of open-ended hollow cylinders mounted coaxially about the interior surface of the cylindrical shell 24. Each of the chambers 26 is affixed to the cylindrical shell 24. Each such cylindrical chamber 26 preferably has a diameter and length just sufficient to receive a single cricket or other insect intended to be carried and dispensed by the present apparatus.

The outlet openings 27 of each chamber 26 are located immediately behind the exit cap 28, which is attached to a shaft 29 extending axially within the interior of the cylindrical shell 24, so that the exit cap is rotatable with respect to the cylindrical shell. The shaft 29 is rotatably received within the fixed bushing 30 which is secured to the inside of the end wall 25. The inlet openings 40 of each chamber 26 are aligned with corresponding openings in the end wall 25, and the chambers are secured to the end wall. A single exit opening 31 is provided on the outer face 32 of the exit cap 28, so that the exit opening 31 can be aligned with the outlet openings 27 in each of the chambers 26 by rotating the exit cap. The exit cap 28 may have an outer flange 33 having molded protrusions to assist in gripping and rotating the exit cap.

Attached to the inner end 37 of the shaft 29 is the entrance gate 38, which in the disclosed embodiment takes the shape of a flat disc having an entrance opening 39 in radial alignment with the inlet openings 40 of the chambers 26. Since the entrance gate 38 is secured to the shaft 29 for rotation therewith, it will be seen that the entrance opening 39 can be serially aligned with the inlet opening 40 of each chamber 26 as the entrance gate is rotated. A funnel-shaped guide member 41 may be attached to the entrance gate, in alignment with the entrance opening 39, for rotation with the entrance gate. It is important that the entrance opening 39 of the entrance gate 38 and the exit opening 31 of the exit cap 28 be angularly misaligned to the extent of angular displacement between adjacent chambers 26, or a whole-number multiple thereof, so that such two openings are never concurrently aligned with the same chamber 26.

The operation of the apparatus as thus far described is now considered, and it is assumed that a quantity of crickets or other insects has already been loaded into the chamber 11 through the opening 18 in the first end member 13. It next becomes necessary to load each of the chambers 26 with a cricket, which is accomplished by permitting a cricket to crawl through the guide member 41 (if provided) and the entrance opening 39 in the entrance gate 38 to enter a particular chamber 26. The exit cap 38 is then rotated to align the entrance opening 39 with the inlet opening 40 of another one of the chambers 26, so that a cricket can enter that chamber. The foregoing sequence is repeated until a cricket has entered each of the chambers 26, at which time it will be understood that the exit opening 31 is now aligned with a selected chamber 26 which contains a cricket. That cricket will emerge from the exit opening 31 to be used as bait, and the aforementioned misalignment of the entrance opening 39 prevents another cricket from entering that selected chamber at the time. The just-vacated chamber becomes reloaded with another cricket in the course of rotating the exit cap 28 as aforementioned.

Figure 5:
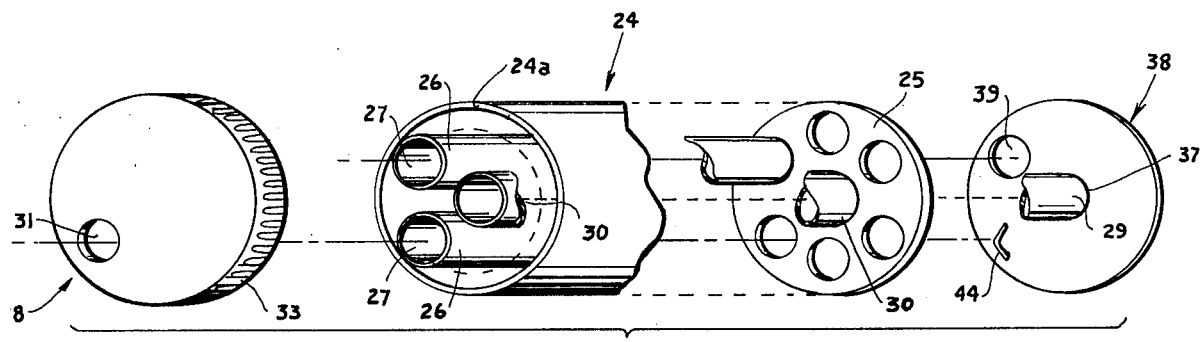
FIG. 5 is a left end elevation view of the disclosed embodiment as seen from the left side of FIG. 1.

It may be desirable to provide a member 44, best shown in FIG. 5, which enters the inlet opening 40 of a chamber 26 as the exit opening is aligned with that chamber, to prod or urge the cricket forward toward the exit opening. The member 44 may be provided by a resilient protrusion mounted on the forward side of the entrance gate 38, in angular alignment with the exit opening 31 of the exit cap 28, so that the member 44 always enters a short distance into the chamber 26 as the exit opening is aligned therewith. If desired, the entrance gate 38 may be made of a resilient elastomeric material with the member 44 molded thereon in proper alignment for selective entry into the inlet openings 40 of the chambers 26.

It will be apparent that the foregoing relates only to a disclosed embodiment of the present invention, and that numerous changes and modifications may be made therein without departing from the spirit or scope of the invention as set forth in the following claims.

We claim:

1. Insect carrier and dispenser apparatus, comprising:
   means defining a container for receiving and retaining a number of insects;
   a plurality of individual insect receiving chambers mounted in proximity to said container, each said chamber having an entrance and a separate exit;
   entrance means disposed between said carrier and the entrances of said plural chambers, said entrance means selectably permitting an insect within said container to enter a selected one of said chambers and blocking insect entry into at least one other such chamber;
   exit means disposed adjacent the exits of said plural chambers to close all but one of said other chambers to the exit of an insect within each of said chambers; and
   means operatively interconnecting said entrance means and said exit means to prevent entrance and concurrent exit of an insect from the same chamber.

2. Apparatus as in claim 1, wherein each of said chambers is big enough to receive not more than one of a selected kind of insect.

3. Apparatus as in claim 1, further comprising guide means carried by said entrance means to assist the entry of an insect into said selected one chamber.

4. Insect carrier and dispenser apparatus, comprising:
   means defining a container for receiving and retaining a number of insects;
   a plurality of individual insect receiving chambers mounted in proximity to said container;
   entrance means disposed between said carrier and said plural chambers, said entrance means selectably permitting an insect within said container to enter a selected one of said chambers;
   exit means disposed adjacent said plural chambers to close all but a selected other one of said chambers to the exit of an insect within each of said chambers;
   said entrance means and exit means being interconnected to prevent entrance and simultaneous exit of an insect from the same chamber; and
   means operative to protrude into said selected other chamber so as to stimulate the exit of an insect contained therein.

5. Insect carrier and dispenser apparatus, comprising:
   means defining a container for receiving and retaining a number of insects;
   a plurality of individual insect receiving chambers mounted in proximity to said container;
   said plural chambers being mounted with inlet openings on a circular path and with outlet openings on a circular path;
   entrance means disposed between said carrier and said plural chambers, said entrance means selectably permitting an insect within said container to enter a selected one of said chambers;
   said entrance means comprising a first wall member mounted for rotation in exposure to the interior of said container and having an entrance opening which serially moves into alignment with each of said inlet openings as said first wall member is rotated;
   exit means disposed adjacent said plural chambers to close all but a selected other one of said chambers to the exit of an insect within each of said chambers;
   said exit means comprising a second wall member mounted for rotation adjacent to said outlet openings and having an exit opening which serially moves into alignment with each of said outlet openings as said second wall member is rotated;
   said entrance means and exit means being interconnected to prevent entrance and simultaneous exit of an insect from the same chamber; and
   said interconnection of said entrance means and said exit means comprising means interconnecting said first and second wall members for rotation in unison and with said entrance and exit opening aligned on different ones of said chambers.

6. Insect carrier and dispenser apparatus, comprising:
   means defining a container for receiving and retaining a number of insects;
   a plurality of individual insect receiving chambers mounted in proximity to said container;

said plural chambers being mounted in fixed relation to said container means;

each of said chambers having an insect inlet opening confronting said container and an insect outlet opening;

entrance means disposed between said carrier and said plural chambers, said entrance means selectably permitting an insect within said container to enter a selected one of said chambers;

said entrance means being movably mounted with respect to said plural chambers to selectively unblock said inlet opening of any one of said chambers;

exit means disposed adjacent said plural chambers to close all but a selected other one of said chambers to the exit of an insect within each of said chambers;

said exit means being movably mounted with respect to said plural chambers to selectively unblock said outlet opening of any one of said chambers, and said entrance means and exit means being interconnected to prevent entrance and simultaneous exit of an insect from the same chamber.

* * * * *